UNITED STATES PATENT OFFICE.

JOSEPH von EPLER, OF NEW YORK, N. Y.

PROCESS FOR PRESERVING VEGETABLES, FRUITS, AND THE LIKE.

1,236,382.      Specification of Letters Patent.      Patented Aug. 7, 1917.

No Drawing.      Application filed January 3, 1917. Serial No. 140,455.

*To all whom it may concern:*

Be it known that I, JOSEPH von EPLER, a subject of the Czar of Russia, residing at New York city, N. Y., have invented certain new and useful Improvements in Processes for Preserving Vegetables, Fruits, and the like, of which the following is a clear, full, and exact description.

This invention relates to a process for preserving vegetables, fruits and other similar organic fibrous substances. In accordance with the present invention I am able to prepare and treat vegetables and fruits so that they will keep for an indefinite period and at the same time preserve all of their nutritive values and retain their full flavor and odor. Vegetables and fruits prepared in accordance with my improved process may be used in the preparation of soups, by the simple addition of hot water. They may also be used in the preparation of any other foods in which vegetables or fruits form a part.

In addition to its preservation against decay, the fruits or vegetables are greatly reduced in volume and weight by the present process, due to the elimination of a large part of the water content, and this removal of the water is effected without any chemical reaction, so that upon restoring the water the fruit or vegetable supplies its original food value and taste.

My method is preferably carried out as follows:

The fresh vegetables are first washed and the skins are removed, after which they are preferably reduced to a mashed pulp by any suitable mashing or pulping machine. The juice of the vegetables or fruits extracted as a result of the pulping operation is retained and further juice is squeezed out of the pulp by pressure, which may be done in cloth bags beneath a hydraulic press, or by means of suitable filter presses well known in the art. This pressing out of the juice is carried out at ordinary temperatures and should be continued to a sufficient extent to extract substantially all of the juice which may be mechanically removed by such pressure machines. It is obvious that mashing of the vegetables or fruits into pulp and pressing out the juice may be performed in one operation with a suitable designed filter press.

The separated juice is then concentrated by slow evaporation at a temperature under boiling point, until it reaches about the consistency of a syrup. This evaporation may be suitably carried out in shallow open pans subjected to a steam bath, but care should be taken not to evaporate the juices above 212° F. boiling point of water, as otherwise a greater proportion of the volatile constituents of the vegetable or fruit will be driven off than is desirable, for it is these volatile constituents which give taste and aroma to vegetables and fruits.

The pressed pulp from which the aforementioned juices have been removed is separately treated with beef fat, and for this purpose is preferably shredded or broken up and stirred in a quantity of melted beef fat at a temperature above boiling point, 212° F. This treatment is continued until the fibrous pulp loses still further portions of its moisture and at the same time becomes thoroughly impregnated with the liquid fat. The fat-impregnated fibrous pulp is then again subjected to pressure in the filter press or other pressure machine to remove surplus fat.

The fat-impregnated pulp, after removal from the filter press in the form of pressed cakes, is then again broken up or separated mechanically into loose divided condition, after which salt to the amount of 5% of said pulp along with the evaporated juice obtained as above described, is added and the whole material thoroughly mixed by mechanical stirring and agitation. When the prepared pulp is thus recombined with its syrupy juice, the process is finished and the product may be compressed into a paste or even hard blocks set aside for the market.

It will be found that when thus prepared, vegetables or fruits will not spoil or ferment, or absorb moisture which might form a fungus, even when exposed to the atmosphere for long periods.

Fruits containing a large amount of sugar, such as berries, may be preserved by a similar process to that described above, with the exception of omitting the fat, above mentioned, and using 10% of sugar instead of salt.

What I claim as new is:—

1. A process for preserving vegetables and fruits, which consists in separating the juice from the fibrous pulp thereof by pressure, concentrating the separated juice by evaporation to the consistency of a syrup, impregnating the separated fibrous pulp with fat, and recombining said pulp with the syrupy juice.

2. A process for preserving vegetables and fruits, which consists in separating the juice from the fibrous pulp thereof by pressure, concentrating the separated juice by evaporation to the consistency of a syrup, impregnating the separated fibrous pulp with fat, and recombining said pulp with the syrupy juice and 5% of salt.

3. A process for preserving vegetables and fruits, which consists in separating the juice from the fibrous pulp thereof by pressure, concentrating the separated juice by evaporation at a temperature below 212° F. to the consistency of a syrup, impregnating the separated fibrous pulp with fat, and recombining said pulp with the syrupy juice.

4. A process for preserving vegetables and fruits, which consists in separating the juice from the fibrous pulp thereof by pressure, concentrating the separated juice by evaporation to the consistency of a syrup, impregnating the separated fibrous pulp with fat at a temperature above 212° F., and recombining said pulp with the syrupy juice.

5. A process for preserving vegetables and fruits, which consists in separating the juice from the fibrous pulp thereof by pressure, concentrating the separated juice by evaporation at a temperature below 212° F. to the consistency of a syrup, impregnating the separated fibrous pulp with fat at a temperature above 212° F., and recombining said pulp with the syrupy juice.

6. A process for preserving vegetables and fruits, which consists in separating the juice from the fibrous pulp thereof by pressure, concentrating the separated juice by evaporation at a temperature below 212° F. to the consistency of a syrup, impregnating the separated fibrous pulp with fat at a temperature above 212° F., adding salt to the amount of approximately 5% of said impregnated pulp, and recombining said pulp with the syrupy juice.

7. A process for preserving vegetables and fruits, which consists in separating the juice from the fibrous pulp thereof by pressure, concentrating the separated juice by evaporation to the consistency of a syrup, adding sugar to the amount of 10% of said pulp, and recombining said pulp with the syrupy juice.

Signed at New York, N. Y., this 30th day of December, 1916.

JOSEPH von EPLER.

Witnesses:
B. MIRVIS,
C. T. NEAL.